United States Patent Office 3,776,816
Patented Dec. 4, 1973

3,776,816
PROCESS FOR PRODUCING STEROID
DEHYDROGENASE
Osamu Terada, Tokyo, Hitoshi Yagi, Matsudo-shi, Chiba-ken, and Shizuko Nakamura, Tokyo, Japan, assignors to Kyowa Hakko Kogyo Kabushiki Kaisha, Tokyo-to, Japan
No Drawing. Continuation-in-part of abandoned application Ser. No. 34,636, May 4, 1970. This application Aug. 21, 1972, Ser. No. 282,251
Claims priority, application Japan, May 6, 1969, 44/34,034
Int. Cl. C07c 167/00; C12d 13/10
U.S. Cl. 195—66 R        6 Claims

ABSTRACT OF THE DISCLOSURE

Steroid dehydrogenase, useful for the determination of hydroxy groups at the 3β- and 17β-positions of steroids, is produced by cultivating a strain of bacteria, designated as *Brevibacterium sterolicum*, in a culture medium and recovering the resulting steroid dehydrogenase from the microbial cells and the culture medium.

This is a continuation-in-part of copending application Ser. No. 34,636, filed May 14, 1970, now abandoned.

BACKGROUND

Field of the invention

This invention relates to the production of enzymes by the culturing of bacteria, and in particular, relates to the production of steroid dehydrogenase (hereinafter designated as S.D.).

Description of prior art

It has already been reported that a certain species of *Microbacterium* secretes S.D. and that cholestenone is produced from cholesterol by this enzyme system (Journal of Biological Chemistry, vol. 206, 511 (1954)). However, the activity of S.D. produced in this manner is extremely low and no precise description regarding the enzymatic chemical properties appeared in the report.

SUMMARY OF THE INVENTION

The present invention relates to an improved process for the production of steroid dehydrogenase (S.D.). In particular, it relates to a process which is characterized by culturing a new species of Brevibacterium, named by the inventors *Brevibacterium sterolicum*, in a culture medium and recovering S.D. from the microbial cells and the culture medium.

DETAILED DESCRIPTION OF THE INVENTION

The new strain of bacteria, capable of producing steroid dehydrogenase in accordance with this invention, was discovered by the inventors during the investigation of S.D.-producing strains from natural sources to determine cholesterol in living bodies. From the characteristics of the new strain, the inventors determined that it belongs to the genus Brevibacterium and, since it produces steroid dehydrogenase, they have named it *Brevibacterium sterolicum*. A culture specimen of *Brevibacterium sterolicum* has been deposited, without restriction, with the American Type Culture Collection and has received ATCC No. 21387.

The microbiological properties of *Brevibacterium sterolicum* are as follows:

(1) Short rod: 1.2–2.1µ × 1.5–2µ
(2) Motility: none
(3) Gram staining: positive
(4) Acid resistance: none
(5) Spore: not formed
(6) Growth on bouillon agar: slow when cultured at 30° C. for 2–4 days, forming circular and smooth small colonies which are slightly in protrusion, in entire and reddish gray or pinkish orange
(7) Growth on bouillon slant: slow growth in linear
(8) Bouillon broth: supernatant slightly tubid, forming a small amount of dense sediment
(9) Stab: growth only on the upper surface, no growth in the stab
(10) Gelatin: not liquefied
(11) Physical properties:
   Litmus milk—no change
   Nitrate—reduced
   $H_2S$—produced
   Indol—not produced
   Ammonia—not produced
   Starch—not decomposed
   Use on fermentation of sugars—no fermentation in the use of glucose, fructose, mannose, galactose, sucrose, maltose, arabinose and xylose. Lactose and mannitrol were not used.
(13) Catalase: positive
(14) Urease: very weak or negative According to the present process for producing steroid dehydrogenase, S.D. is produced by culturing *Brevibacterium sterolicum* in a culture medium with or without cholesterol. However, a larger amount of S.D. can be inductively produced by the addition of cholesterol. The choice of the processes can be determined depending upon the purpose.

S.D. produced by the use of microorganism of the present invention secreted not only in the microbial cells but also in the culture medium, so that enzyme can be recovered from both the microbial cells and the culture medium.

For recovery of the enzyme from the cultured medium, the salting out method by ammonium sulfate and the precipitation method by solvent are generally applied. It is possible by the present invention to recover the enzyme with a high yield by any of the known methods without inactivating the enzyme since enzyme is relatively stable.

The enzymatic chemical properties of S.D. and enzyme systems obtained according to the process of the present invention are as follows:

(1) Optimum pH—pH 7–8
(2) pH stability—stable at a pH of 3–10, preferably at a pH of 6–10
(3) Heat resistance—stable until 50° C., inactivated rapidly at more than 60° C.

The enzyme product of the invention not only dehydrogenates the OH— group at the 3β-position of cholesterol but dehydrogenates the 3β-hydroxy and 17β-hydroxy groups of other steroids containing these groups. However, it does not act on OH— groups at other positions, nor does it act on esters. It is therefore a useful tool in the microbiological production of steroids. On the basis of such characteristics, the enzyme product can be used, inter alia, for determination of the structure of various steroids or for determination of partial free-form and ester-form cholesterols in living bodies. Furthermore, by the use of the stable and effective steroid dehydrogenase according to the present invention it is advantageously possible to convert selectively the free-form cholesterol contained in serum or other cholesterol-containing material into cholestenone. Thus, the free-form cholesterol can be quantitatively determined for example by using characteristic absorption of UV spectra of cholestenone.

The following non-limitative examples illustrate the present invention.

EXAMPLE 1

*Brevibacterium sterolicum* (ATCC 21387) was inoculated to a culture medium (pH 7.0) containing peptone (1%) and calcium carbonate (0.5%) and cultivated at 37° C. with shaking or aerating. After 72 hours, microbial cells and other solid materials were removed from the fermentation liquor by filtration or centrifugation, and the supernatant of filtrate was concentrated at not more than 35° C. under reduced pressure to ½ to 1/10. The thus obtained concentrate was cooled to not more than 5° C. and about two times its volume of cold acetone (−10° C. to −15° C.) was gradually added with stirring. After 30 minutes, keeping the temperature of the material not more than 10° C., the produced precipitate was separated by filtration or centrifugation. After washing with cold acetone, the acetone was removed at a low temperature, whereby a pale brown powder was obtained. The yield is 50–400 g. from a fermentation liquor of 100 l. The enzymatic activity was 1,000 $\mu$/mg.

EXAMPLE 2

The solid materials obtained by filtering or centrifuging a fermentation liquor produced as in Example 1 were suspended in about 10 times volume of M/50 phosphate buffer solution. A small amount of ethyl-acetate was added and the mixture was allowed to stand at 30° C. for a night. The solid materials were removed by centrifugation and the supernatant was treated in a similar manner to that described in Example 1, whereby yellowish brown enzyme powder was obtained. The yield was 100–150 g. from the fermentation liquor of 100 l. and the enzymatic activity was 1,200 $\mu$/g. Although the thus obtained powder has a slight hygroscopic property, it can be preserved for a considerably long period of time at room temperature in dried state.

EXAMPLE 3

The cultivation was carried out in a similar manner to those described in Examples 1 and 2 with the exception of the use of cholesterol in the culture medium to yield. The yield was 6–40 g. and 10–16 g. from the culture medium and microbial cells respectively per 100 l. of fermentation liquor.

REFERENCE 1

The enzyme preparate which was obtained in Example 1 was dissolved in water in such a manner that the enzymatic activity is 800 $\mu$/ml. 0.2 ml. of the thus obtained enzyme preparate-containing solution was put in a small test tube in which 0.1 ml. of standard serum containing 92.5 mg./100 ml. of free-form cholesterol and 287.5 mg./100 ml. of ester-form cholesterol had been placed. The mixture was aerated at ambient temperature for 30 minutes by means of a capillary tube. After completion of the reaction, the reaction mixture was added with 10 ml. of propanol with shaking and was heated to 80° C. for 10 minutes to give precipitates of protein. After cooled, the supernatant was collected and the absorption at 243 m$\mu$ was measured. A mixture of standard serum (0.1 ml.), the enzyme solution (0.2 ml.) and propanol (10 ml.) was used as a control to determine cholestenone and free-form cholesterol. Examples of the analytical value of free-form cholesterol were 91.2 mg./100 ml., 91.4 mg./100 ml. and 93.6 mg./100 ml.

What we claim is:

1. A process for producing selectively a steroid dehydrogenase which comprises culturing a steroid dehydogenase-producing microorganism of the species *Brevibacterium sterolicum* in a culture medium and recovering the steroid dehydrogenase from the resultant material, wherein the steroid dehydrogenase is capable of dehydrogenating 3$\beta$- and 17$\beta$-hydroxy groups of steroids without acting on OH— groups at other positions.

2. The process of claim 1 wherein the steorid dehydrogenase is recovered from the culture medium and the microbial cells.

3. The process of claim 1 wherein microbial cells and other solids are filtered from the culture medium and steroid dehydrogenase is precipitated from the resultant liquor.

4. The process of claim 1 wherein microbial cells are separated from the culture medium and steroid dehydrogenase is extracted from said cells.

5. The process of claim 1 wherein the culture medium contains cholesterol.

6. The process of claim 1 wherein said microorganism is *Brevibacterium sterolicum* of ATCC No. 21387.

References Cited

UNITED STATES PATENTS

| | | | |
|---|---|---|---|
| 2,837,464 | 6/1958 | Nobile | 195—51 E |
| 3,388,042 | 6/1968 | Arima et al. | 195—51 G |

LIONEL M. SHAPIRO, Primary Examiner

U.S. Cl. X.R.

195—103.5 R